US011549030B2

(12) United States Patent
Grießer et al.

(10) Patent No.: US 11,549,030 B2
(45) Date of Patent: Jan. 10, 2023

(54) WATER-BASED HYBRID INK, AND METHOD FOR THE PRODUCTION OF AN ARTICLE PRINTED WITH SAID INK

(71) Applicant: Durst Phototechnik Digital Technology GmbH, Lienz (AT)

(72) Inventors: Thomas Grießer, Sankt Peter Freinstein (AT); Matthias Edler, Gratwein-Straßengel (AT); Florian Mostegel, Graz (AT); Meinhart Roth, Graz (AT); Aleksandra Benedikt, Vienna (AT); Andreas Österreicher, Leoben (AT); Janine Billiani, Graz (AT); Richard Piock, Bruneck (IT); Sebastian Lenz, Thal-Assling (AT)

(73) Assignee: DURST PHOTOTECHNIK DIGITAL TECHNOLOGY GMBH, Lienz (AT)

( * ) Notice: Subject to any disclaimer, the term of this patent is extended or adjusted under 35 U.S.C. 154(b) by 141 days.

(21) Appl. No.: 15/778,697

(22) PCT Filed: Oct. 21, 2016

(86) PCT No.: PCT/EP2016/001744
§ 371 (c)(1),
(2) Date: May 24, 2018

(87) PCT Pub. No.: WO2017/088942
PCT Pub. Date: Jun. 1, 2017

(65) Prior Publication Data

US 2018/0346744 A1 Dec. 6, 2018

(30) Foreign Application Priority Data

Nov. 25, 2015 (DE) ........................ 102015015143.6

(51) Int. Cl.
*C09D 11/38* (2014.01)
*C09D 11/101* (2014.01)
*C09D 11/102* (2014.01)
*C09D 11/107* (2014.01)
*C09D 11/30* (2014.01)

(52) U.S. Cl.
CPC ............ *C09D 11/38* (2013.01); *C09D 11/101* (2013.01); *C09D 11/102* (2013.01); *C09D 11/107* (2013.01); *C09D 11/30* (2013.01)

(58) Field of Classification Search
CPC ...... G03F 3/016; G03F 1/1637; G03F 1/1601; G03F 1/1626; G03F 3/041; H04B 1/3888; H04M 2250/22; H04M 1/026; C09D 11/38; C09D 11/30; C09D 11/101; C09D 11/102; C09D 11/107
See application file for complete search history.

(56) References Cited

U.S. PATENT DOCUMENTS

2003/0017269 A1* 1/2003 Schierlmann ........ C09D 175/04 427/325
2003/0144375 A1* 7/2003 Wu ........................ C09D 11/40 523/160
2003/0159607 A1 8/2003 Nitzan et al.
2004/0209976 A1* 10/2004 Nakhmanovich .... C09D 11/101 523/160
2008/0132600 A1 6/2008 Nesvadba et al.
2010/0068387 A1* 3/2010 Gibson .................. C09D 11/30 427/256
2010/0104979 A1 4/2010 Dietliker et al.
2012/0288972 A1 11/2012 McKean
2014/0099449 A1 4/2014 Tielemans et al.
2015/0064417 A1 3/2015 Choi et al.

FOREIGN PATENT DOCUMENTS

DE 102005008931 A1 8/2006
DE 602004006908 T2 2/2008
EP 1036831 A1 9/2000
EP 1792956 A1 6/2007
EP 2657308 A1 10/2013
EP 2703459 A1 3/2014
JP H06248198 A 9/1994
WO 2013034880 A2 3/2013

OTHER PUBLICATIONS

European Patent Office, Rijswijk, Netherlands, International Search Report of International Application No. PCT/EP2016/001744, dated Dec. 8, 2016, 3 pages.

* cited by examiner

*Primary Examiner* — Jessica M Roswell
(74) *Attorney, Agent, or Firm* — Crowell & Moring LLP; John C. Freeman

(57) ABSTRACT

A water-based hybrid ink that includes as components (a) water, (b) an UV-curing oligomer and/or polymer containing ethylenically unsaturated functional groups, (c) a humectant, (d) a radical-forming photoinitiator, wherein the hybrid ink additionally includes (e) a heat-curing oligomer and/or polymer containing complementary functional groups.

20 Claims, No Drawings

WATER-BASED HYBRID INK, AND METHOD FOR THE PRODUCTION OF AN ARTICLE PRINTED WITH SAID INK

CROSS REFERENCE TO RELATED APPLICATIONS

This application claims priority to PCT/EP2016/001744 filed on Oct. 21, 2016 and DE 102015015143.6 filed on Nov. 25, 2015, the entire contents of each herein incorporated in their entirety by reference.

FIELD

This disclosure pertains to the field of water-based inks, alternatively inkjet inks, and concerns a water-based hybrid ink comprising as components (a) water, (b) a UV-curing oligomer and/or polymer containing ethylenically unsaturated functional groups, (c) a humectant, (d) a radical-forming photoinitiator, wherein the hybrid ink further comprises (e) a heat-curing oligomer and/or polymer with complementary functional groups.

Furthermore the present disclosure pertains to a method of producing an article printed with a hybrid ink in accordance with the teachings presented herein.

BACKGROUND

The statements in this section merely provide background information related to the present disclosure and may not constitute prior art.

Water-based inks with UV-curing resins and acrylate monomers are an increasingly discussed topic in the printing industry. Such inks make it possible to create thinner cured ink films on a substrate in comparison to the typical acrylic-based UV inks, which consist largely of one or more monomers, whereby expensive acrylate monomer as a starting material can be saved.

EP1036831 A1, for example, discloses a water-based ink of this type with a UV-curing resin and an acrylate monomer, which is used in an inkjet printer. This ink comprises a urethane oligomer, a monomer with a trifunctional or higher reactive group, a photopolymerization initiator, a colorant, and an aqueous solvent, wherein the monomer is an acrylate monomer based on trimethylolpropane, pentaerythritol, or dipentaerythritol.

Furthermore, in the examples provided in this document discloses a printing process wherein in a first step, droplets of this ink are printed on a substrate. In a second step, the droplets are dried at a specific temperature to remove the aqueous solvent, and subsequently in a third step, the droplets are irradiated with UV light to cure the UV components of the ink.

Additionally, this document discloses in the description a printing process wherein in a first step droplets of this ink are printed on a substrate. In a second step, the droplets are irradiated in UV light to cure the UV components of the ink, and in a third step the droplets are dried at a specific temperature to remove the aqueous solvent.

WO2013034880A2 describes a similar water-based ink comprising the components i) polyurethane with ethylenically unsaturated groups, ii) a water-soluble triacrylate, iii) a colorant, iv) a liquid comprising water and an organic solvent, v) optionally a photoinitiator, vi) optionally a surfactant, whereby the proportion of component iv) is greater than the rest of the components of the ink combined. Furthermore, the document discloses a method for printing a substrate with this ink, wherein in a first step the ink is dried and in a second step the ink is irradiated with UV light to cure the UV components of the ink.

DE602004006908T2 describes a water-based ink for an inkjet printing process comprising water, a water-miscible resin, and a water-soluble UV-curable humectant, which is chosen from a polyalkylene glycol acrylate, polyether acrylate, a highly ethoxylated derivative of acrylate, polyethylene glycol diacrylate, polyether triacrylate, ethoxylated trimethylolpropane triacrylate, or any combination of these. In accordance with this method, such inks are applied to the substrate to be printed in a first step, heated to remove water in a second step, and cured with UV radiation in a third step.

EP 1 792 956 B1 discloses a water-based mixture curable with electron radiation comprising: i) water, ii) an ethylenically unsaturated oligomer, iii) a water-soluble ethylenically unsaturated resin containing neutralized acidic or basic functional groups, which is a surface-active material incorporating chemically hydrophilic or hydrophobic structures; wherein the resulting mixture is a single-phase solution containing no photoinitiator.

EP 2 703 459 B1 discloses a method for forming up a printing mechanism, wherein the method comprises the following steps: i) preparing of a photocuring ink mixture containing a colorant, water, a photoinitiator, a UV-curing polyurethane dispersion, a hydrophobically radiation-curing monomer, and a water-soluble or water-miscible radiation-curing monomer; ii) preparing of a substrate medium; iii) spraying of a jet of droplets of the photocuring ink onto the substrate medium; iv) pinning the inkjet mixture as soon as it is printed on the substrate medium; v) drying the ink mixture; vi) applying light energy to the ink mixture, wherein the light energy has a frequency- and energy-level suitable for curing the photocuring ink mixture.

The water-based inks described above indeed make it possible to create thinner hardened films. However, after curing, they usually retain a residual amount of unreacted—that is, uncured—photoinitiator and/or UV-curing monomer and/or UV-curing oligomer and/or polymer.

It would be desirable to have a water-based ink available which, on the one hand, utilizes the advantages of the aforementioned inks, and on the other hand makes possible the creation of ink films which, after curing, retain at least a lower amount of at least one unreacted UV-curing component.

SUMMARY

The present disclosure generally addresses the root of the problem by creating a water-based hybrid ink which, in comparison with the water-based inks known in the prior art, has a smaller UV-curing portion of its composition.

This objective is achieved by providing a water-based hybrid ink that comprises as components (a) water, (b) a UV-curing oligomer and/or polymer with ethylenically unsaturated functional groups, (c) a humectant, (d) a radical-forming photoinitiator, wherein the hybrid ink further comprises (e) a heat-curing oligomer and/or polymer with complementary functional groups.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is in no way intended to limit the present disclosure or its application or uses. It should be understood that throughout the description, corresponding reference numerals indicate like or corresponding parts and features.

Here it is necessary to define in advance several terms used in the present disclosure. When the term "oligomer" is used in the context of this description, it is to be understood as a molecule with a molecular mass in the range between and including 1,000 and 10,000. When, however, the term "polymer" is used in this description, it is to be understood as a molecule with a molecular mass greater than 10,000.

For the purpose of this disclosure, the percent sign "%" is used in this description to signify weight percentage.

For the purpose of this disclosure, when the term "water-miscible" is used in this description, it is to be understood that the component in question is either partially or completely water-soluble. When, however, the term "water-dispersible" is used in this description, it is to be understood that the component in question is not water-soluble or is barely water-soluble.

For the purpose of this disclosure, when the term "component" is used in this description, it is to be understood as a pure component.

According to one aspect of the present disclosure, the addition of the heat-curing oligomer and/or polymer with complementary functional groups makes it possible to reduce the UV-curing portion of an ink so that UV-curing for the hybrid ink no longer plays as large of a role in the handling process. The water-based hybrid ink comprises as components (a) water, (b) a UV-curing oligomer and/or polymer with ethylenically unsaturated functional groups, (c) a humectant, (d) a radical-forming photoinitiator, wherein the hybrid ink further comprises (e) a heat-curing oligomer and/or polymer with complementary functional groups.

According to another aspect of the present disclosure, the hybrid ink comprises as a further component (f) a crosslinking monomer with at least two ethylenically unsaturated functional groups, alternatively, at least three.

Hybrid inks in accordance with some designs of the present disclosure can contain a smaller portion of radical-forming photoinitiator in comparison to a similar water-based ink without heat-curing components. The reduction of this portion can go hand in hand with the reduction of the portion of monomer and/or the portion of UV-curing oligomer and/or polymer. This makes the hybrid ink in accordance with the teachings of the present disclosure more environmentally friendly, and of particular interest for the printing of food packaging, since this area requires adherence to increasingly strict regulatory requirements.

For example, according to Commission Regulation (EC) no. 2023/2206 from Dec. 22, 2006, a printed surface may not come into direct contact with food products, wherein additionally the constituent components of the ink may not pass into the food product in concentrations which lead to intrinsic values within the food product which do not comply with the requirements of article 3 of Regulation (EC) no. 1935/2004.

It is known, however, that a number of the commercially available radical-forming photoinitiators now belong, along with the monomers that are usually free-moving by nature, to the list of aforementioned ink constituents which can leach out of the packaging and into the food products, thus often resulting in contamination of packaged food products. The leaching of these constituents can take place in two ways.

Firstly, contamination can occur when the ink constituents migrate from the ink through the substrate (indirect path) and/or secondly as a result of the packaging material rubbing together in its stack or roll (direct path), so that the ink constituents again reach the food-facing side of the packaging material.

For direct packaging wherein food products, particularly liquid food products such as milk, are in direct contact with the inside wall of the packaging material, printing ink must be chosen with exceptional care in order to comply with legal requirements. This is especially true for those cases where the packaging does not always constitute an effective barrier against migrating UV ink constituents Although the ink constituents often only migrate into food products in concentrations measured in parts per billion (ppb), this may already exceed legal allowances and constitute a danger to human health.

With hybrid inks in accordance with some embodiments of the present disclosure, the risk of contamination by UV components can be at least partially reduced. This in turn improves the quality of food products and subsequently the safety of consumers.

In addition to the advantageous health aspects, it has also been shown that the hybrid inks in accordance with some embodiments of the present disclosure exhibit a comparable or greater storage stability when compared with the water-based inks known thus far.

Hybrid inks in accordance with embodiments can also have a comparable or longer "open time" in comparison with the water-based hybrid inks in use thus far. The term "open time" means in this case the time interval between two print operations, during which no printing takes place and after which all nozzles still function faultlessly. "Faultlessly" means in this case that the nozzles in question do not develop any partial or complete blockages of ink and therefore there is no need for a purge step, which would cost time. In this so-called "purge step", all nozzles of the printing heads are activated one or more times in order to reliably flush them.

As described above, the hybrid ink in accordance with the teachings of the present disclosure comprises multiple components, which will be examined more closely here.

Water (component (a)) serves as a carrier agent and/or a solvent for the remaining ink components. The water can be pure water, which is obtained for example using an ion exchanger, an ultrafiltration system, or reverse osmosis. The total amount of water is calculated from the sum of the water directly added as component (a) and the amount indirectly added in the various products, which may contain the remaining components.

The total amount of water varies between 20% and 70%, and alternatively, constitutes a portion of the ink of >40%, alternatively, >50%.

The UV-curing oligomer and/or polymer with ethylenically unsaturated functional groups (component (b)) has multiple radically polymerizable groups, which undergo crosslinking reactions under UV irradiation, whereby a radical-forming photoinitiator usually initiates the crosslinking reaction. This component is water-dispersible or water-miscible. Suitable components (b) are, for example, included in the products Alberding [TN: should be Alberdingk] LUX 399 or Bayhydrol UV XP 2775.

According to another aspect of the present disclosure, the hybrid ink, the UV-curing oligomer and/or polymer with ethylenically unsaturated functional groups is an oligo- and/or polyurethane acrylate.

The component (b) may be present in the hybrid ink as dispersed particles having a particle size distribution of i) d(0.99)<3.0 μm, alternatively <2.0 μm, and ii) d(0.9)<1.6 μm, alternatively <0.8 μm, alternatively <0.4 μm, and iii) d(0.5)<1.0 μm, alternatively <0.5 μm, alternatively <0.25 μm.

According to another aspect of the preset disclosure, the amount of UV-curing oligomer and/or polymer in the ink constitutes between 2% and 40%, alternatively between 5% and 25%.

The humectant (component (c)) prevents the ink from drying too rapidly, in particular on the nozzle openings of the print heads of an inkjet printer. The humectant may be a water-soluble organic compound having a boiling point above 160° C., and alternatively above 170° C. Suitable humectants for the hybrid ink are, for example, ethylene glycols, glycerol, 1.6-hexanediol, propylene glycol, pyrrolidin-2-one, 1.5 pentadiol, 2-methyl-1.3-propanediol, polyethylene glycol (PEG 200, PEG 400), dipropylene glycol, tripropylene glycol, glycol ethers such as dipropylene glycol monomethyl ether, dipropylene glycol monobutyl ether, dipropylene glycol monopropyl ether.

According to yet another aspect of the present disclosure, the amount of humectant in the ink is between 2% and 40%, alternatively between 5% and 30%.

In still another aspect the humectant comprises at least two water-soluble organic compounds with a boiling point preferably above 160° C., and alternatively above 170° C.

In another embodiment the humectant is a UV-curing humectant, which respectively includes one or more UV-curing ethylenically unsaturated groups.

When desirable, the humectant may be a heat-curing humectant, which respectively includes one or more heat-curing complementary functional groups.

A humectant can just as well be comprised of mixtures of at least one non-curing and at least one UV-curing or heat-curing humectant.

The radical-forming photoinitiator (component (d)) serves to initiate the polymerization reaction. Examples of suitable photoinitiators include phenyl hydroxy ketones such as 4-(2-hydroxyethoxy)phenyl (2-hydroxy-2-methylpropyl) ketone, thioxanthones, such as isopropylthioxanthone, benzophenones (4-chlorobenzophenone, 4-4'-bis(diethylamino) benzophenone), alkylbenzophenones, halogenated benzophenones (4-chlorobenzophenone, 4 4'-dichlorobenzophenone), anthraquinones, anthrones (9 (10H)-anthracenone), benzoin, benzil and benzil derivatives such as benzil dimethyl ketal, phosphine oxides or phosphine sulfides such as bisacrylphosphine oxide and 2,4,6-trimethylbenzoyl diphenylphosphine oxide. Additional suitable and commercially available photoinitiators include Irgacure 2959, Irgacure 819DW, Irgacure TPO-L, Irgacure 184, Irgacure 907, Irgacure 500, Irgacure 127, Irgacure1173 (all BASF), APi-180 (Shenzhen UV-ChemTech), Q-BPQ (3B Scientific).

According to some embodiments of the present disclosure, the amount of radical-forming photoinitiator in the ink is between 0.1% and 5%, alternatively, between 0.5% and 3.0%.

The heat-curing oligomer and/or polymer with complementary functional groups (component (e)) undergoes crosslinking reactions with sufficient thermal input. The complementary functional groups thereby take part in the thermal crosslinking reaction.

When the term "complementary functional groups" is used in the context of this description, it is understood to mean a reactive functional group which can undergo a polyaddition or polycondensation reaction. It is not understood to mean a reactive functional group which can undergo homolytic cleavage due to UV irradiation and subsequently undergo a crosslinking reaction.

The heat-curing oligomers and/or polymers in question are self-crosslinking and/or externally crosslinking under the effect of thermal action.

These oligomers and/or polymers can, for example, include carbamate and/or allophanate and/or isocyanate groups, and/or complementary functional groups to the aforementioned groups within the molecule. Suitable reactive functional groups include, for example, isocyanate-reactive functional groups, such as thiol, hydroxyl, and/or primary and/or secondary amino groups.

Suitable heat-curing oligomers and/or polymers are found, for example, in the products JoncrylECO2177 or Alberdingk® AC 2523.

According to another design of the hybrid ink of the present disclosure, the heat-curing oligomer and/or polymer with complementary functional groups is a corresponding acrylate or urethane acrylate.

According another embodiment of the present disclosure, component (e) is present in the hybrid ink as dispersed particles with a particle size distribution of i) d(0.99)<3.0 μm, alternatively <2.0 μm, and ii) d(0.9)<1.6 μm, alternatively <0.8 μm, alternatively <0.4 μm, and iii) d(0.5)<1.0 μm, alternatively <0.5 μm, alternatively <0.25μ.

In yet another design, the relative amount of heat-curing oligomer and/or polymer in the ink varies between 2% and 30%, alternatively between 2% and 20%.

As already described, the hybrid ink can comprise as component (f) a crosslinking monomer with at least two ethylenically unsaturated functional groups, alternatively at least three, which serves as a crosslinking agent for the UV-curing oligomers and/or polymers with ethylenically unsaturated functional groups.

The monomer may be water-miscible. Suitable monomers are, for example, alkoxylated triacrylates, glyceryl triacrylate, trimethylolpropane triacrylate, pentaerythritol triacrylate or dipentaerythritol polyacrylate (having at least three acrylic functional groups). According to some embodiments of the present disclosure, the amount of crosslinking monomer in the ink lies between 0.1% and 10%, alternatively between 0.1% and 6%.

The hybrid ink can comprise a colorant (component (f)). The colorant serves as a coloring component. This may be an inorganic or organic dye. Further, the colorant can be an inorganic or organic color pigment. The hybrid ink can comprise a dye and/or a color pigment as a colorant.

When the term "dye" is used in the context of this description, it is to be understood as a water-miscible colorant. In contrast, when the term "color pigment" is used in the context of this description, it is to be understood as a water-dispersible colorant. Metal-ligand complexes can also be used as colorants. Examples of suitable colorants include colorant from the Clariant International AG company, such as HostaJet Black O-PT, HostaJet Cyan BG-PT, HostaJet Magenta E-PT, HostaJet Yellow 4G-PT.

If insoluble colorants are used as component (g) which are present in the hybrid ink as dispersed color pigments, the particles of the corresponding pigments exhibit a particle size distribution of i) d(0.99)<3.0 μm, alternatively <2.0 μm, and
ii) d(0.9)<1.6 μm, alternatively <0.8 μm, alternatively <0.4 μm, and
ii) d(0.5)<1.0 μm, alternatively <0.5 μm, alternatively <0.25 μm.

According to some embodiments of the present disclosure, the relative amount of colorant in the ink lies between 1% and 10%, alternatively, between 1% and 6%.

The ink may additionally be mixed with a lubricating and/or leveling additive (component (h)), which serves to reduce the surface tension of the hybrid ink. Examples of suitable lubricating and/or leveling additives include Byk347, Byk333, or TegoTwin4100.

According to some embodiments of the present disclosure, the relative amount of lubricating and/or leveling additive in the ink is between 0.01% and 5%, alternatively between 0.05% and 2.0%.

A dispersing additive can also be added to the hybrid ink. It is known that the dispersing agent (component (i)) promotes the wetting and stabilization of insoluble particles. Thus, the dispersing agent prevents floating as well as settling of the respective particles, which in the case of color particles results in a high degree of consistency of color location, and color strength is maintained during storage or circulation.

The ink can be mixed with an anti-foaming agent (component (j)) which functions both to prevent foaming and to break down foam which has already formed. For example, siloxanes can be used as an anti-foaming agent. Siloxane-free anti-foaming agents can also be used.

The hybrid ink can be an inkjet printer ink. For an inkjet printer ink, it is desirable that the viscosity lies in an area between approximately 3 and approximately 20 mPas at a temperature between 20 and 50 degrees Celsius.

In one particular design, the hybrid ink is prepared as a hybrid ink comprising (a) 20% to 70%, alternatively 40% to 70% of component (a),
(b) 02% to 40%, alternatively 05% to 25% of component (b),
(c) 02% to 40%, alternatively 05% to 30% of component (c),
(d) 0.1% to 05%, alternatively 0.5% to 3.0% of component (d),
(e) 02% to 30%, alternatively 02% to 20% of component (e), and optionally at least one of the components:

(f) 0.1% to 10%, alternatively 0.1% to 06% of component (f),
(g) 01% to 10%, alternatively 01% to 06% of component (g),
(h) 0.01% to 5%, alternatively 0.05% to 2.0% of component (h), wherein the total water content in the ink is >50%.

Components (b) and (e) of the hybrid ink may also be present as a single component (z) such that the corresponding oligomer and/or polymer has UV-curing ethylenically unsaturated groups as well as heat-curing complementary functional groups.

According to another aspect of the present disclosure, component (z) is present in the hybrid ink as dispersed particles with a particle size distribution of i) d(0.99)<3.0 μm, alternatively <2.0 μm, and
ii) d(0.9)<1.6 μm, alternatively <0.8 μm, alternatively <0.4 μm, and
iii) d(0.5)<1.0 μm, alternatively <0.5 μm, alternatively <0.25 μm.

According to yet another design, the relative amount of component (z) in the ink varies between 2% and 40%.

The hybrid ink can also comprise at least one additional component (b) and/or at least one additional component (e) and/or at least one additional component (z).

In one form, the hybrid ink further comprises (I) a crosslinking monomer with at least two complementary functional groups, preferably at least three.

For creating a desired article with the hybrid ink, the method according to this invention can be used, which comprises the following steps:

a) providing a substrate,
b) providing a water-based hybrid ink in accordance with the teachings of the present disclosure,
c) applying of droplets of the hybrid ink onto the substrate,
d) at least partial curing of the UV-curing component in the droplets using a UV radiation source,
e) wherein at least a partial curing of the heat-curing component in the droplets takes place using a NIR and/or IR radiation source, whereby in step (e) water and humectants are at least partially removed.

In contrast to the water-based inks known in the prior art, which are only curable with UV light, the curing of the present hybrid ink being takes place in two steps, which are based on two different curing mechanisms, namely UV-curing and heat curing.

The order of operations of the UV-curing step and the heat-curing step may be insignificant if the aim is solely to achieve certain adhesion characteristics and scratch resistance of an ink film on a substrate.

It has been shown that in hybrid inks in accordance with some preferred design forms, comparable or only slightly differing results in adhesion and scratch resistance characteristics of an ink film applied to a substrate could be achieved regardless of the order of operations in the curing process. However, for the overall result of an image printed on a substrate using the hybrid ink in an inkjet printer, the order of operations is very important.

The person skilled in the art should note that in this context various factors influence the overall result, particularly the quality of the printed image to be produced on the substrate. These include, among other factors, the ink color and the length of time in which the ink applied to the substrate is exposed to a UV and NIR and/or IR radiation source at a predetermined intensity.

It is generally known that black substrates heat up significantly more than white substrates when exposed to sunlight. The cause of this includes, among other factors, the interaction of the substrate in question with the near infrared radiation (NIR), which however is not limited exclusively to the absorption of electromagnetic radiation, a process in which the electromagnetic waves are converted to heat, but also in the heat radiated by the surface; that is, emissions in the far infrared.

When a substrate printed with a hybrid ink using the inventive method is exposed to NIR radiation, the printed substrate is usually exposed on the front side, meaning that the ink is directly exposed. The front side is the side of the substrate which has been printed with the ink, which faces the radiation source and thus has the shortest path to the radiation source.

The frontal exposure of the ink naturally has the greatest effect, as it strikes the ink without any intermediate barriers and thus without losing energy. It is thereby possible to heat-treat the hybrid ink on the substrate in a relatively short time period. In contrast, if the ink is exposed from the back side of the substrate, either a small fraction of the original radiation intensity or no radiation at all will reach the hybrid ink, depending upon the thickness of the substrate. Naturally, the thickness of the material is one of multiple factors influencing the weakening of the radiation intensity.

The inventive thus makes it possible to produce a large number of items, as the heat curing process takes place on the front side of the item, so that the thickness of the substrate is not a factor. Examples of suitable substrates include cardboard, aluminum, plastic sheet, wood sheet, MDF sheet, packaging materials, and plastic films.

Caution is recommended, however, when heat-sensitive substrates are used. As noted above, inks with dark colors heat up faster than lighter hues, so that in such cases the time interval as well as the intensity of the NIR or IR radiation should be adjusted such that the substrate is not damaged. Overheating can result in undesirable or even irreversible spreading and thus distortion of the printed image. In the worst case, uncontrolled exposure can lead to the substrate catching fire.

When performing the heat-curing process in accordance with step (e), the person skilled in the art must be aware that the selected time and intensity of the NIR exposure to the substrate to be printed and if necessary with consideration of the ink colors to be used must be determined in advance, in order to perform this step as quickly as possible and thus to preserve the desired quality, but without subsequent damage to the substrate and the printed image.

In order to achieve a high print quality with the method, it is preferable that curing steps (c) and (d) be carried out in alphabetical order. The curing of the UV-curable component or components in the first curing step enables instantaneous pinning of the droplets, which preferably occurs immediately after the printing operation according to step (b), which at least partially reduces or stops the drops from falling apart or running together, which is effected by the at least partial crosslinking of the UV-curing components. Subsequently in the second step the curing of the heat-curable component/s occurs, resulting in crosslinking of the heat-curing component or components. Water and humectants are at least partially removed in this step.

If, in contrast, the heat-curing step (d) takes place before the UV-curing step (c), it has been observed that the desired high print quality is not always achieved.

Although not wanting to be bound by a single explanation or theory, it is assumed that the reversal of the alphabetical order of the curing steps does not always achieve a high level of print quality because the time period in which the droplets must be exposed to the NIR and/or IR radiation in order to harden the heat-curing portion of the ink at the required temperature on different substrates and to at least partially remove the water and the humectant is markedly longer than the time period required for the UV-curing steps, so that in the course of this longer time the drops spread out or run together too much.

It is known that different substrates have different surface energies, with the result that they are wetted differently by the ink. The greater the span of time between printing and curing, the more pronounced this effect becomes, so that different substrate types can exhibit different degrees of glossiness. In contrast, if the UV-curing portion of the ink is pinned in the first step, this undesired effect can be at least partially reduced.

According to yet another form of the method, the printing of droplets of the hybrid ink upon a substrate using an inkjet printer is performed by spraying droplets of ink from a print head. The droplets can exhibit a volume in the range between 5 and 40 picoliters. The application of the droplets can be performed to form an ink film.

In one specific embodiment among many embodiments, the droplets and/or the developed ink film are exposed in step (d) to a UV radiation dose in a range between 50 and 5000 mJ/cm$^2$, alternatively between 100 and 1000 mJ/cm$^2$, alternatively between 100 and 500 mJ/cm$^2$ for a predetermined period of time, and in step (e) are exposed to a NIR and/or IR radiation source for a predetermined period of time, which may lie between 10 and 300 seconds, with a dose appropriate for the hybrid ink and the substrate.

When desirable, the UV-curing process using a UV radiation source according to step (d) can take place immediately after step (c).

According to another embodiment, air is blown over the ink using a forced air system in step (e) in place of or in addition to the NIR and/or IR radiation source. This approach is advantageous, among other reasons, in that the insulating air layer covering the ink can be eliminated more quickly. If forced air is used instead of an NIR and/or IR radiation source, according to the invention the air must have a sufficiently high temperature to effect at least a partial curing of the heat-curing component or components within the predetermined time interval. This temperature may fall in a range between approximately 50 and 90° C. In contrast, if the air is used only as a supplement, it can have a temperature between 15 and 90° C.

For production of an article according to the method of the present disclosure, it is recommended to use the method that comprises the following steps:

a) providing a substrate,
b) providing a water-based hybrid ink in accordance with the teachings of the present disclosure,
c) applying of droplets of the hybrid ink onto the substrate,
d) at least partial curing of the UV-curing component in the droplets using a UV radiation source,
e) whereby at least a partial curing of the heat-curing component in the droplets takes place using a NIR and/or IR radiation source and/or forced air, whereby in step (e) water and humectants are at least partially removed.

In a specific form of the method, in step (e) forced air is blown over the droplets with a temperature of approximately 15 to approximately 90° C.

In another embodiment of the present disclosure, the ink films created have an adhesion characteristic value (Gt) according to crosscut test DIN EN ISO 2409 of at least 1, alternatively 0, and scratch resistance according to the Wolff-Wilborn ISO 15184 pencil scratch test of at least 3B.

In yet another form of the present disclosure, the droplets are applied with an inkjet printer operating with a scanning print module, which comprises a UV radiation source, and with a substrate feed, whereby a scan direction and a substrate feed direction are defined, wherein the scan direction and the feed direction are different from one another, and wherein the scanning print module provides pinned print lines on the substrate, which are then at least partially cured with an NIR and/or IR radiation source and/or forced air, wherein the NIR and/or IR radiation source and/or the forced air source is located opposite the print module, downstream in the feed direction. The NIR and/or IR radiation source and/or a forced air source can be implemented as a scanning or stationary unit.

In another form of the present disclosure, the droplets are applied with an inkjet printer operating with a stationary print module and a media feed, thereby defining a feed direction for the substrate, whereby one or more lines are printed by the stationary print module in step (c), which are then at least partially cured by a UV radiation source in step (d), whereby the UV radiation source is located opposite the stationary print module downstream in the feed direction of the substrate, and whereby the at least partially UV-cured line or lines are at least partially cured in step (e) using a NIR and/or IR radiation source and/or forced air, in which the NIR and/or IR radiation source is located opposite the UV radiation source downstream in the feed direction of the substrate.

In a further variant of the method, the heat-curing step takes place using an oven instead of a NIR and/or IR radiation source. All of the preferred forms listed above can also be used here, as long as they are not exclusively applicable to NIR and/or IR curing.

This objective of the present disclosure is thus also realized by a method of producing an article comprising the following steps:

a) providing a substrate to be printed,
b) providing a water-based hybrid ink in accordance with the teachings of the present disclosure,
c) applying of ink droplets onto the substrate to be printed,
d) at least partial curing of the UV-curing component in the droplets using a UV radiation source,
e) wherein at least a partial curing of the heat-curing component in the droplets takes place using an oven, wherein in step (e) water and humectants are at least partially removed.

In contrast to one of the aforementioned methods, in which step (e) involves exclusively the NIR and/or IR radiation source, it is to be noted here that the partial curing of the ink droplets with use of an oven generally requires more time than when step (e) is carried out using a NIR and/or IR radiation source. It is therefore preferable that the invented process is carried out using a NIR and/or IR radiation source.

In one form, the droplets and/or the developed ink film are exposed in step (d) to a UV radiation dose in a range between 50 and 5000 mJ/cm$^2$, alternatively between 100 and 1000 mJ/cm$^2$, alternatively between 100 and 500 mJ/cm$^2$ for a predetermined period of time, and in step (e) are exposed to a heat source at 50 to 90° C. for 20 to 300 seconds. Of course shorter or longer drying times are conceivable, as long as sufficient heat curing and drying is ensured and no damage to the substrate results from longer drying times.

In yet another embodiment of the present disclosure, the ink films created exhibit an adhesion characteristic value (GT) according to crosscut test DIN EN ISO 2409 of at least 1, alternatively 0, and scratch resistance according to the Wolff-Wilborn ISO 15184 pencil scratch test of at least 3B, as is the case with NIR and/or IR curing and drying.

The following experimental example is intended to explain in greater detail the preparation of a form of the ink as well as the implementation of a version of the method for producing an article, however without showing any limitations. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1—Production of a Hybrid Ink

Production was carried out for the test inks V1 to V4 and V5 to V8 listed in tables 1 and 2 according to the following steps:

- Providing separate products of the formula to be mixed, whereby a first product comprises water as component (a), a second product comprises a UV-curing oligomer and/or polymer with ethylenically unsaturated functional groups as component (b), a third product comprises a humectant as component (c), a fourth product comprises a radical-forming photoinitiator as component (d), a fifth product comprises a heat-curing oligomer and/or polymer with complementary functional groups as component (e), a sixth product comprises a crosslinking monomer with at least two ethylenically unsaturated functional groups, preferably at least three, as component (f), and wherein a seventh product comprises a colorant as component (g),
- before printing, mixing of the first, second, third, fourth, fifth, sixth, and seventh products; and
- before printing a substrate, filtration of the ink with a 5-6 μm Aero Last Chance Filter from the Pall Corporation.

A Mastersizer analysis with particle size measurement has shown that the particle size distribution of the particles existing in the finished ink is approximately d (0.5)=0.25 μm and d(0.9)=0.4 μm in diameter.

Example 2—Production of the Article and Test Results

The hybrid inks were applied to a Melinex substrate with a wet film thickness of 12 μm. The at least partial curing of the UV-curing components in the applied ink follows, using a UV radiation source to expose the ink to a UV dose of 200 mJ/cm$^2$. Subsequently the heat-curing component of the applied ink was at least partially cured using an oven (oven at 70° C., 60 sec), whereby in this step water and humectant are partially removed.

The film properties, namely adhesion and scratch resistance, of the ink films produced on the Melinex substrate were then tested.

The analysis demonstrated that the ink films produced with the method of the present disclosure exhibited an adhesion characteristic value according to crosscut test DIN EN ISO 2409 of Gt 0, and scratch resistance according to the Wolff-Wilborn ISO 15184 pencil scratch test of at least 3B. These ink films were produced by following the alphabetical order of operations for steps (d) and (e).

Example 3—Article Produced by Reversing the Alphabetical Order of Operations for Curing Steps (d) and (e)

For the sake of comparison, an experimental example was produced with reversal of steps (d) and (e), so that heat curing according to step (e) was carried out in the first step using an oven (oven at 70° C., 60 sec) and subsequently UV curing according to step (d) was carried out in the second step (dose: 200 mJ/cm$^2$). The ink formulation V1 was used for this experiment. The ink film produced by this method had an adhesion characteristic value according to crosscut test DIN EN ISO 2409 of GT 0, and scratch resistance according to the Wolff-Wilborn ISO 15184 pencil scratch test of 2B.

TABLE 1

| Components | Product | V1 | V2 | V3 | V4 |
|---|---|---|---|---|---|
| | | Product percentage (%) | | | |
| (a) | Deionized water | 37.75 | 37.75 | 37.75 | 35.75 |
| (b) + (f) | PUD Bayhydrol UV XP 2775: Component b: Aliphatic urethane acrylate (ca. 40% in H2O = ~7.2% of the hybrid ink)) Component c: Dipentaerythritol hexaacrylate | 18.00 | 18.00 | 18.00 | 18.00 |
| (c) | Propylene glycol | 20.00 | 20.00 | 20.00 | 20.00 |
| (d) | Irgacure ® 2959 | 0.50 | 0.50 | 0.50 | 0.50 |
| (d) | Irgacure ® 819 DW (>=25.0-<50.0% (active components)) | 0.75 | 0.75 | 0.75 | 0.75 |
| (e) | Alberdingk ® AC 2523 Component f (Fixed resin portion: 47.0-49.0%) = ~5.64 to 5.88% of the hybrid ink | 12.00 | 12.00 | 12.00 | 12.00 |
| (g) | HostaJet Cyan BG-PT (ca. 20% in H2O) Component b: = ca. 2.0% of the hybrid ink | 10.00 | — | — | — |
| (g) | HostaJet Yellow 4G-PT (ca. 20% in H2O) | — | 10.00 | — | — |
| (g) | HostaJet Black O-PT (ca. 15% in H2O) | — | — | 10.00 | — |
| (g) | HostaJet Magenta E-PT (ca. 20% in H2O) | — | — | — | 12.00 |
| (h) | Byk 333 | 0.33 | 0.33 | 0.33 | 0.33 |
| (h) | Byk 347 | 0.67 | 0.67 | 0.67 | 0.67 |
| Total | | 100 | 100 | 100 | 100 |
| Total water content in the hybrid ink (rough estimate) | | >50 | >50 | >50 | >50 |
| Viscosity [mPas] at 25 degrees Celsius | | 5.4 | 5.4 | 5.2 | 5.3 |
| Film properties of the article created by maintaining the alphabetical order of operations of the curing steps | | | | | |
| Adhesion characteristic value according to crosscut test DIN EN ISO 2409 | | 0 | 0 | 0 | 0 |
| Scratch resistance according to the Wolff-Wilborn ISO 15184 pencil scratch test | | 2B | B | 2B | 3B |

TABLE 2

| Components | Product | V5 | V6 | V7 | V8 |
|---|---|---|---|---|---|
| | | Product percentage (%) | | | |
| (a) | Deionized water | 38.00 | 38.00 | 38.00 | 36.00 |
| (b) + (f) | PUD Bayhydrol UV XP 2775: Component b: alphatic urethane acrylate (Ca. 40% in H2O = 7.2%) Component c: Dipentaerythritol hexaacrylate (Ca. 4% in H2O = 0.72%) | 18.00 | 18.00 | 18.00 | 18.00 |
| (c) | Propylene glycol | 18.00 | 18.00 | 18.00 | 18.00 |
| (c) | Sartomer SR415 (UV-curing humectant) | 2.00 | 2.00 | 2.00 | 2.00 |
| (d) | Irgacure ® 2959 | 1.00 | 1.00 | 1.00 | 1.00 |
| (d) | Irgacure ® 819 DW (>=25.0-<50.0% (active components)) | 0.50 | 0.50 | 0.50 | 0.50 |
| (e) | Alberdingk ® AC 2523 Component f (Fixed resin portion: 47.0-49.0%) = ~5.64 to 5.88% of the hybrid ink | 12.00 | 12.00 | 12.00 | 12.00 |
| (g) | HostaJet Cyan BG-PT (ca. 20% in H2O) Component b: = ca. 2.0% of the hybrid ink | 10.00 | — | — | — |
| (g) | HostaJet Yellow 4G-PT (ca. 20% in H2O) | — | 10.00 | — | — |
| (g) | HostaJet Black O-PT (ca. 15% in H2O) | — | — | 10.00 | — |
| (g) | HostaJet Magenta E-PT (ca. 20% in H2O) | — | — | — | 12.00 |
| (h) | Tego Twin 4100 | 0.5 | 0.5 | 0.5 | 0.5 |
| Total | | 100 | 100 | 100 | 100 |
| Total water content in the hybrid ink (rough estimate) | | >50 | >50 | >50 | >50 |
| Viscosity [mPas] at 25 degrees Celsius | | 6.0 | 6.0 | 5.8 | 6.0 |
| Film properties of the article created by maintaining the alphabetical order of operations of the curing steps | | | | | |
| Adhesion characteristic value according to crosscut test DIN EN ISO 2409 | | 0 | 0 | 0 | 0 |
| Scratch resistance according to the Wolff-Wilborn ISO 15184 pencil scratch test | | 3B | 2B | 3B | 3B |

It should be noted here that a UV post-curing of the already-cured ink in accordance with the teachings of the present disclosure led to no significant improvement of the film properties in terms of adhesion and scratch resistance.

The aforementioned ink formulations were applied to various substrates for the experiment, for example coated paper, aluminum, and PVC. Experiments demonstrated that, at least for the specified substrates, the film properties exhibit almost identical color fastness with associated good abrasion and color durability.

Evaluation of the hybrid inks for their printability was conducted with a drop watcher unit (Dimatix Material Printer (DMP)-2831). The focus of the test was the determination of the so-called open time of the nozzles of a print head (Dimatix Materials Cartridges (DMC-11610)). For the printing tests, the prepared ink formulas were filtered with a 5-6 μm Aero® Last Chance Filter (LCF), a self-contained complete filter for point-of-use filtration in digital printing systems, from the Pall Corporation. The ink formulation V1 from Table 1 is taken as an example, which demonstrates an open time of 12 minutes immediately after production and after three weeks of storage at 60° C. still demonstrates an open time of 10 minutes.

A method for producing a hybrid ink according to the teachings of the present disclosure has been given, wherein the method comprises the following steps:

i) Providing separate products of the formula to be mixed, whereby a first product comprises water as component (a), a second product comprises a UV-curing oligomer and/or polymer with ethylenically unsaturated functional groups as component (b), a third product comprises a humectant as component (c), a fourth product comprises a radical-forming photoinitiator as component (d), a fifth product comprises a heat-curing oligomer and/or polymer with complementary functional groups as component (e), ii) before printing, mixing of the first, second, third, fourth, and fifth products.

It is to be noted here that a product can comprise a component as a 100% pure product or a <100% mixed product.

According to another embodiment, in step i) at least one further product is provided which comprises a crosslinking monomer with at least two ethylenically unsaturated functional groups, preferably at least three, as component (f), or comprises a colorant as component (g) or comprises a lubricating and/or leveling additive as component (h) or comprises a dispersing agent as component (i) or comprises an anti-foaming agent as component (j) and that in step ii) at least one product is mixed with the other products before printing.

According to yet another embodiment, a component (z) can be mixed into the formulation in step i) either instead of or in addition to components (b) and (e).

The hybrid ink may be filtered before printing through a suitable filter, and particles (of any origin) dispersed therein with a particle size distribution of i) d(0.99)<3.0 μm, alternatively <2.0 μm, and ii) d(0.9)<1.6 μm, alternatively <0.8 μm, alternatively <0.4 μm, and iii) d(0.5)<1.0 μm, alternatively <0.5 μm, alternatively <0.25 μm are preserved.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A water-based hybrid ink comprising as components:

(a) water, (b) UV-curing oligomer and/or polymer with ethylenically unsaturated functional groups, (c) a humectant, (d) a radical-building photoinitiator, whereby the hybrid ink further comprises:

(e) a heat-curing oligomer and/or polymer with complementary functional groups, which has a structure that is self-crosslinking under the effect of thermal action, wherein the complementary functional groups have a structure configured to undergo polyaddition or polycondensation reactions with each other, wherein the hybrid ink is an inkjet printer ink.

2. The hybrid ink in accordance with claim 1, further comprising component (f) a crosslinking monomer with at least two ethylenically unsaturated functional groups.

3. The hybrid ink in accordance with claim 1, wherein the UV-curing oligomer and/or polymer with ethylenically unsaturated functional groups is an oligo- and/or polyurethane acrylate.

4. The hybrid ink in accordance with claim 1, wherein the heat-curing polymer with complementary functional groups is an oligo- or polyacrylate and/or an oligo- and/or polyurethane acrylate.

5. The hybrid ink in accordance with claim 2, further comprising a colorant as a further component (g).

6. The hybrid ink in accordance with claim 1, wherein the humectant is an organic humectant with a boiling point >160 degrees Celsius.

7. The hybrid ink in accordance with claim 1, wherein the humectant is a UV-curing humectant, which exhibits one or more UV-curing ethylenically unsaturated groups.

8. The hybrid ink in accordance with claim 1, wherein the humectant is a mixture of a non-curing humectant, a UV humectant, or a heat-curing humectant.

9. The hybrid ink in accordance with claim 1, further comprising a lubricating and/or leveling additive as an additional component (f).

10. The hybrid ink in accordance with claim 1, further comprising at least one additional component (b) and/or at least one additional component (e).

11. A method for producing a printed article comprising:

a) providing a substrate, b) providing a water-based hybrid ink comprising as components:

i) water, ii) UV-curing oligomer and/or polymer with ethylenically unsaturated functional groups, iii) a humectant, iv) a radical-building photoinitiator, whereby the hybrid ink further comprises:

v) a heat-curing oligomer and/or polymer with complementary functional groups, which has a structure that is self-crosslinking under the effect of thermal action, wherein the complementary functional groups have a structure configured to undergo polyaddition or polycondensation reactions with each other, wherein the hybrid ink is an inkjet printer ink, c) applying of droplets of the hybrid ink onto the substrate, d) at least partial curing of the UV-curing component in the droplets using a UV radiation source, wherein, at least a partial curing of the heat-curing component in the droplets takes place using a NIR and/or IR radiation source, wherein the water and humectants are at least partially removed.

12. The method in accordance with claim 11, characterized in that the ink droplets are printed onto the substrate using an inkjet printer.

13. The method in accordance with claim 11, characterized in that the droplets exhibit a size in a range between 5 and 40 picoliters.

14. The method in accordance with claim 11, characterized in that the application of the droplets produces an ink film.

15. The method in accordance with claim 11, characterized in that in step (e) forced air with a temperature between approximately 15 to approximately 90° C. is blown over the ink.

16. The method in accordance with claim 11, characterized in that the applied droplets and/or the developed ink film are exposed in step (d) to a UV radiation dose in a range between 50 and 5000 mJ/cm$^2$ over a predetermined time interval and in step (e) exposed to a NIR and/or IR radiation source with a dose appropriate to the hybrid ink and the substrate over a predetermined time interval between 10 and 300 seconds.

17. The method in accordance with claim 16, characterized in that the ink film created exhibits an adhesion characteristic value (GT) according to crosscut test DIN EN ISO 2409 of at least 1 or 0, and scratch resistance according to the Wolff-Wilborn ISO 15184 pencil scratch test of at least 3B.

18. The method in accordance with claim 11, characterized in that the inkjet printer operates with a scanning print module, which comprises a UV radiation source, and with a substrate feed, whereby a scan direction and a substrate feed direction are defined, wherein the scan direction and the feed direction are different from one another, and wherein the scanning print module provides pinned print lines on the substrate, which are then at least partially cured with an NIR and/or IR radiation source and/or forced air, wherein the NIR and/or IR radiation source and/or the forced air source is located opposite the print module, downstream in the feed direction.

19. The hybrid ink in accordance with claim 1, wherein the complementary functional groups are carbamate and/or allophanate and/or isocyanate groups, and component e) further comprises complementary functional groups to the aforementioned groups, which are configured to be isocyanate-reactive functional groups.

20. The hybrid ink in accordance with claim 19, wherein the isocyanate reactive functional groups are—thiol, hydroxyl, and/or primary and/or secondary amino groups.

* * * * *